United States Patent
Kawakami

(10) Patent No.: US 10,202,004 B2
(45) Date of Patent: Feb. 12, 2019

(54) PNEUMATIC TIRE

(71) Applicant: TOYO TIRE & RUBBER CO., LTD., Osaka-shi, Osaka (JP)

(72) Inventor: Kazuki Kawakami, Osaka (JP)

(73) Assignee: TOYO TIRE & RUBBER CO., LTD., Osaka (JP)

( * ) Notice: Subject to any disclaimer, the term of this patent is extended or adjusted under 35 U.S.C. 154(b) by 85 days.

(21) Appl. No.: 15/340,388

(22) Filed: Nov. 1, 2016

(65) Prior Publication Data
US 2017/0129286 A1    May 11, 2017

(30) Foreign Application Priority Data
Nov. 5, 2015  (JP) ................. 2015-217865

(51) Int. Cl.
| B60C 11/00 | (2006.01) |
| B60C 11/03 | (2006.01) |
| B60C 11/01 | (2006.01) |
| B60C 11/13 | (2006.01) |

(52) U.S. Cl.
CPC ........ B60C 11/005 (2013.01); B60C 11/0008 (2013.01); B60C 11/0083 (2013.01); B60C 11/01 (2013.01); B60C 11/0302 (2013.01); B60C 11/033 (2013.01); B60C 11/1376 (2013.01); B60C 11/0304 (2013.01); *B60C 2011/0025* (2013.01);
(Continued)

(58) Field of Classification Search
CPC ............... B60C 11/0041; B60C 11/005; B60C 11/0083; B60C 11/01; B60C 11/0306; B60C 11/0332; B60C 2011/0386; B60C 2011/0388; B60C 2011/039; B60C 11/04; B60C 11/11

USPC ........................................ 152/209.15, 209.16
See application file for complete search history.

(56) References Cited

U.S. PATENT DOCUMENTS

| 6,095,217 A | * | 8/2000 | Nakamura ............ B60C 1/0016 |
| | | | 152/209.18 |
| 2016/0236519 A1* | | 8/2016 | Wakiyama .......... B60C 11/0306 |
| 2017/0182849 A1* | | 6/2017 | Uchida ................. B60C 11/042 |

FOREIGN PATENT DOCUMENTS

| EP | 1199192 | * | 4/2002 | ............ B60C 11/00 |
| JP | 6-48117 A | | 2/1994 | |
| JP | 2004-58810 A | | 2/2004 | |

(Continued)

OTHER PUBLICATIONS

Office Action dated Apr. 4, 2018, issued in counterpart Chinese Application No. 201610962870.6, with partial English translation. (5 pages).

*Primary Examiner* — Eric Hug
(74) *Attorney, Agent, or Firm* — Westerman, Hattori, Daniels & Adrian, LLP

(57) ABSTRACT

In a tire in which thickness from a boundary B between a cap layer 22 and a base layer 21 to a tire reference contour line L is thicker in a center land section 30 than in a shoulder land section 40, the center land section 30 and the shoulder land section 40 project to an outer side further than the tire reference contour line L, a thickness of the cap layer 22 in a projecting state is thicker in the center land section 30 than in the shoulder land section 40, and the shoulder land section 40 projects the most in a region A between a central position of the shoulder land section 40 in a tire width direction and a position on a main groove side therefrom by ¼ of a length of the shoulder land section 40 in the tire width direction.

5 Claims, 4 Drawing Sheets

(52) U.S. Cl.
CPC . *B60C 2011/039* (2013.01); *B60C 2011/0341* (2013.01); *B60C 2011/0388* (2013.01)

(56) References Cited

FOREIGN PATENT DOCUMENTS

| | | |
|---|---|---|
| JP | 2005-263180 A | 9/2005 |
| JP | 2007-331439 A | 12/2007 |
| JP | 2016-88109 A | 5/2016 |

\* cited by examiner

PNEUMATIC TIRE

CROSS-REFERENCE TO RELATED APPLICATION

The present application is based on and claims the benefit of priority from Japanese Patent Application No. 2015-217865 (filed on Nov. 5, 2015). The content of Japanese Patent Application No. 2015-217865 is incorporated herein in its entirety.

FIELD OF THE INVENTION

The invention relates to a pneumatic tire.

DESCRIPTION OF THE RELATED ART

A tire whose tread projects to an outer side further than a tire reference contour line has conventionally been suggested. For example, a tire disclosed in JP-A-2005-263180 has been made for a purpose of improving steering stability during cornering at a maintained speed, in which a land section (a central rib and a second rib) on an inner side in a tire width direction projects (bulges) to the outer side further than the tire reference contour line (an outer contour line), and in which a position of a vertex of the projection is deviated to the inner side with respect to a center line in the width direction of the land section during mounting to a vehicle. According to this tire, a gently inclined surface is provided on the outer side of the land section during mounting to the vehicle. Thus, the tire securely contacts the ground during cornering at the maintained speed, and the steering stability is secured.

SUMMARY OF THE INVENTION

However, in regard to the tire, in which only the land section on the inner side in the tire width direction projects to the outer side further than the tire reference contour line, a shoulder land section on the outer side in the tire width direction has a poor ground-contact property, and a braking property and a handling property are insufficient. In particular, the above problem is glaring in a tire in which a cap layer of the tread is thick in the land section on the inner side in the tire width direction but is thin in the shoulder land section.

In view of the above, an object of the invention is to provide a pneumatic tire in which a land section on an inner side in a tire width direction projects to an outer side further than a tire reference contour line, in which a shoulder land section has a favorable ground-contact property, and which excels in a braking property and a handling property.

A pneumatic tire of an embodiment is a pneumatic tire in which a tread section includes: a base layer on an inner side in a tire radial direction; and a cap layer including a ground-contact surface on an outer side thereof in the tire radial direction, in which the tread section is partitioned by a main groove to at least include a center land section and a shoulder land section, and in which a thickness from a boundary between the cap layer and the base layer to a tire reference contour line is thicker in the center land section than in the shoulder land section. The pneumatic tire is characterized that the center land section and the shoulder land section project to an outer side further than the tire reference contour line, that a thickness of the cap layer in a projecting state is thicker in the center land section than in the shoulder land section, and that a position where the shoulder land section projects the most exists in a region between a central position of the shoulder land section in a tire width direction and a position on the main grooves side therefrom by ¼ of a length of the shoulder land section in the tire width direction.

The pneumatic tire of this embodiment has a favorable ground-contact property of the shoulder land section and excels in a braking property and a handling property.

DESCRIPTION OF THE PREFERRED EMBODIMENT

A description will be made on a pneumatic tire of this embodiment on the basis of the drawings. Noted that the following description on a structure of the pneumatic tire is a description on a structure thereof in a state where the pneumatic tire is not inflated with air.

In the following description on a tread section of the pneumatic tire, a center land section is a land section that includes a tire equator in the case where a land section that includes a tire equator as in this embodiment exists, and is a land section that is the closest to the tire equator in the case where the land section that includes the tire equator does not exist. In the case where the tire equator exists at the center of inside of a main groove, two land sections that hold the main groove therebetween serve as the center land sections. Meanwhile, a shoulder land section is a land section that includes a ground-contact end.

In the following description on the tread section of the pneumatic tire, the ground-contact end is an end of a ground-contact surface in a tire width direction in a state where the pneumatic tire is subjected to rim assembly to a standard rim, has normal internal pressure, and is applied with a normal load. Here, the standard rim is a standard rim that is defined in standards such as of JATMA, TRA, and ETRTO. In addition, the normal load is a maximum load that is defined in the standards. Furthermore, the normal internal pressure is internal pressure that corresponds to the maximum load. Moreover, in the following description on the tread section of the pneumatic tire, a ground-contact area is a ground-contact area in the state where the pneumatic tire is subjected to the rim assembly to the standard rim, has the normal internal pressure, and is applied with the normal load.

Figure 1:
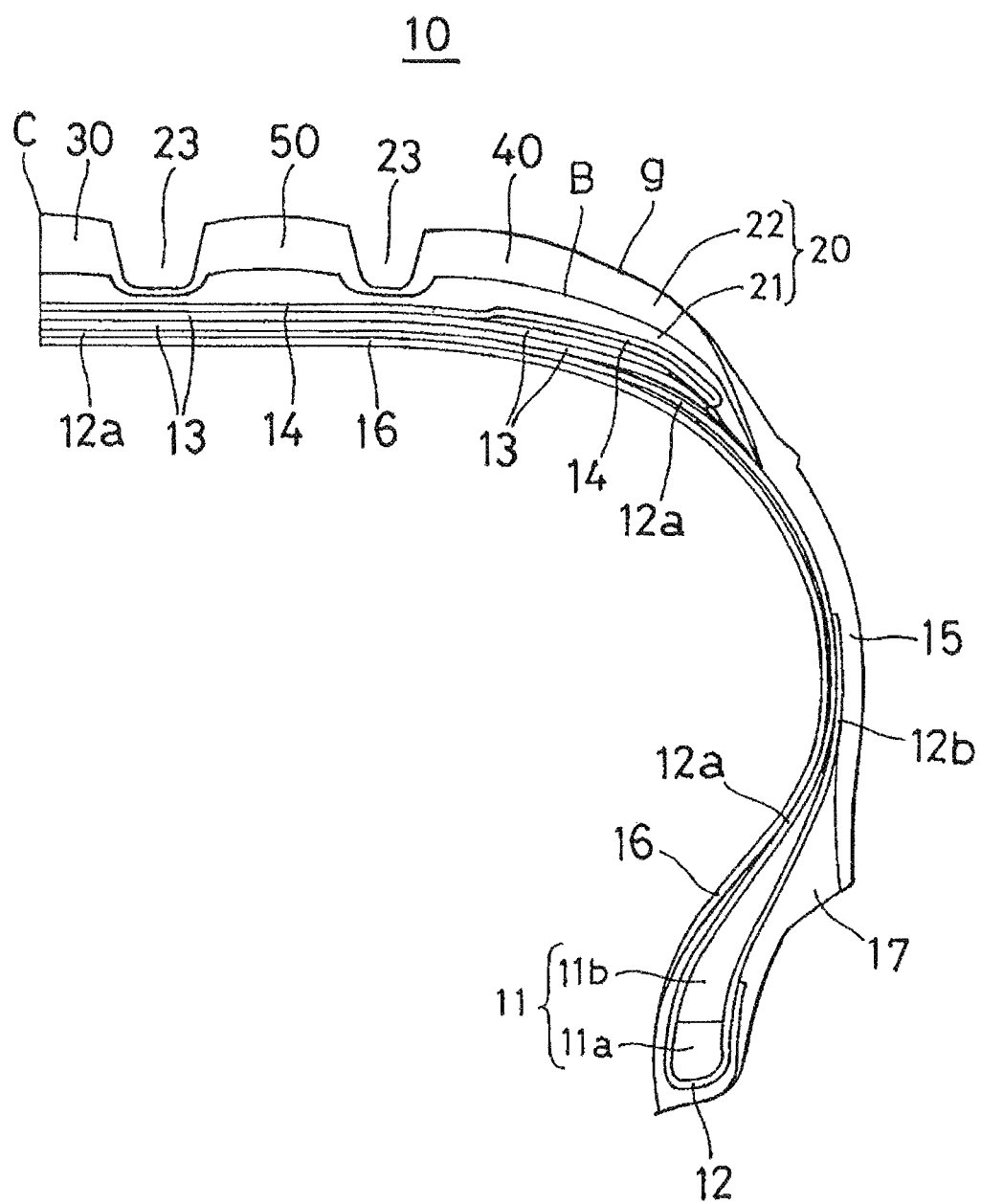
FIG. 1 is a half cross-sectional view of a pneumatic tire 10 of this embodiment in a width direction.

A pneumatic tire 10 of this embodiment has a similar cross-sectional structure to the related art except for a tread section 20. As depicted in FIG. 1, the pneumatic tire 10 has a pair of bead sections 11 on both sides in the tire width direction. The bead section 11 has: a bead core 11a in which bundled steel wires are covered with rubber; and a bead filler 11b as a rubber member that is provided on an outer side of the bead core 11a in a tire radial direction.

In addition, the pneumatic tire 10 includes a carcass ply 12. The carcass ply 12 is formed by covering plural ply cords with the rubber. As the ply cord, an organic fiber cord made of polyester, nylon, or the like, a steel cord, or the like is used. The carcass ply 12 has: a body section 12a that forms a framework of the tire between the pair of the bead sections 11; and a rolled-up section 12b that is formed when extending from the body section 12a, being folded from an inner side to an outer side in the tire width direction around the bead section 11, and being rolled up to the outer side in the tire radial direction.

Plural belts 13 are stacked on the outer side of the carcass ply 12 in the tire radial direction. The belt 13 is formed by covering plural cords that are made of steel or the like with the rubber. In addition, a belt-reinforcing layer 14 is provided on the outer side of the belt 13 in the tire radial direction. The tread 20 that has a ground-contact surface is provided on the outer side of the belt-reinforcing layer 14 in the tire radial direction. Furthermore, side walls 15 and an inner liner 16 are respectively provided on both sides of the carcass ply 12 in the tire width direction and on a tire inner side of the carcass ply 12.

In addition, a rubber chafer 17 is provided at a position that corresponds to the outer side of the carcass ply 12 in the tire width direction and to the outer side of the bead section 11 in the tire width direction. An upper section of the rubber chafer 17 is in contact with a lower section of the side wall 15. The rim comes in contact with a surface of the rubber chafer 17.

The tread section 20 includes a base layer 21 on the inner side in the tire radial direction and a cap layer 22 on the outer side thereof in the tire radial direction. A surface of the cap layer 22 on the outer side in the tire radial direction is a ground-contact surface. Types of the rubber differ among the base layer 21 and the cap layer 22. For example, the base layer 21 is made of rubber with an excellent low heat generation property, the cap layer 22 is made of rubber with an excellent wear resistance property, and hardness and a modulus differ among them. The hardness of the cap layer 22 is desirably equal to or more than 62°. Noted that the hardness is hardness that is measured by a durometer of a type A defined in JIS K 6253.

Figure 2:
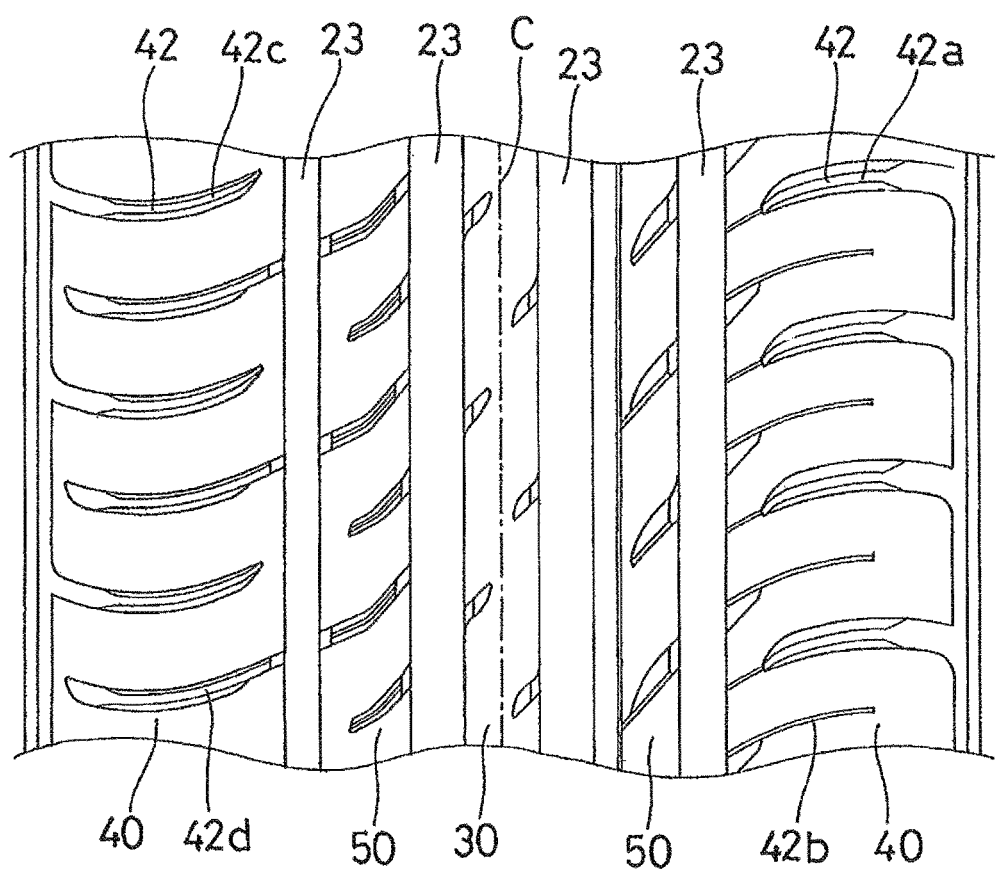
FIG. 2 depicts a tread pattern of the pneumatic tire 10 of this embodiment.

As depicted in FIG. 1 and FIG. 2, plural main grooves 23 that extend in a tire circumferential direction are provided in the tread section 20. In this embodiment, the four main grooves 23 are provided, and, by being partitioned by these main grooves 23, a center land section 30 that includes a tire equator C, a shoulder land section 40 that includes a ground-contact end g on the outer side in the tire width direction, and a mediate land section 50 between the center land section 30 and the shoulder land section 40 are formed. An end of the shoulder land section 40 on the outer side in the tire width direction is the ground-contact end g.

A tire reference contour line L is set on a cross section of these land sections in the tire width direction. The tire reference contour line L is a curve that includes an arc or plural arcs that pass through edges of each of the land sections in the width direction and smoothly continue. In the case where opening ends of all of the main grooves 23 are located on the one arc, the arc serves as the tire reference contour line L. In the case where the opening ends of not all of the main grooves 23 are located on the one arc, the tire reference contour line L is defined as will be described below (see FIG. 3).

First, as for the center land section 30, both edges b, c of the center land section 30 and edges a, d of the mediate land section 50 that respectively oppose these are calculated. Then, of an arc that passes through the edges a, b, c and an arc that passes through the edges b, c, d, the arc with a larger curvature radius is set as the tire reference contour line L. In addition, as for the mediate land section 50, both edges d, e of the mediate land section 50 in the width direction and the edge c of the center land section 30 on the mediate land section 50 side are calculated. Then, an arc that passes through the edges c, d, e is set as the tire reference contour line L. Furthermore, as for the shoulder land section 40, an edge f of the shoulder land section 40 on the mediate land section 50 side, the edge e of the mediate land section 50 on the shoulder land section 40 side, and the ground-contact end g are calculated. Then, an arc that passes through the edges e, f and the ground-contact end g is set as the tire reference contour line L.

Then, a thickness from a boundary B between the base layer 21 and the cap layer 22 to the tire reference contour line L in a normal direction of the tire reference contour line L (referred to as a reference cap thickness) is thick in an order of the center land section 30, the mediate land section 50, and the shoulder land section 40. Here, a thickness at a position in each of the land sections where the thickness from the boundary B to the tire reference contour line L in the normal direction of the tire reference contour line L is the thickest is set as the reference cap thickness.

Figure 3:
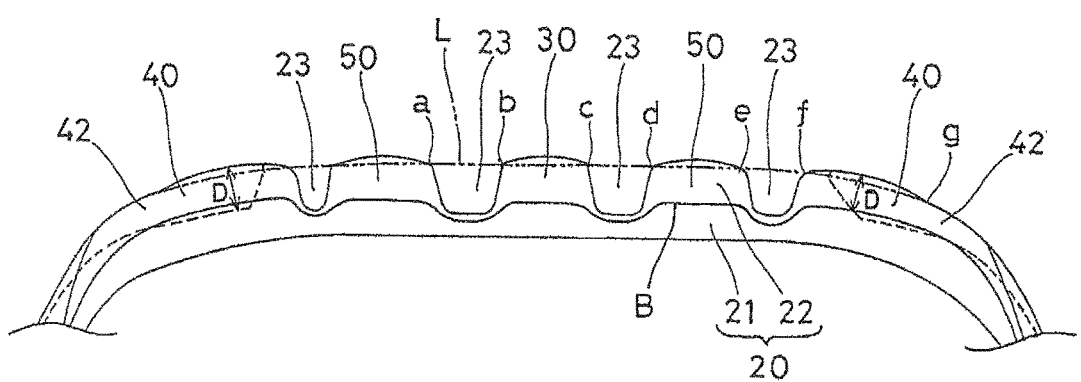
FIG. 3 is a cross-sectional view of a tread section 20 of this embodiment in the width direction.
Figure 4:
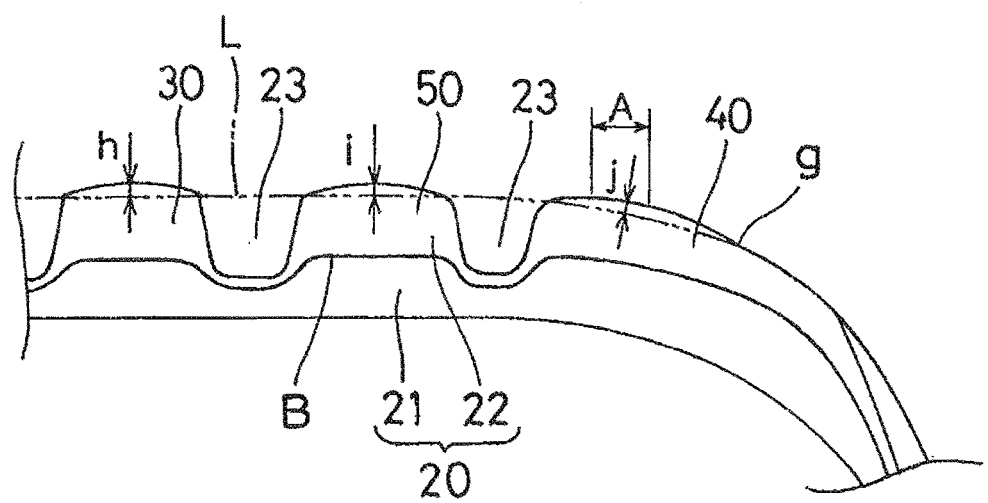
FIG. 4 is a partially enlarged view of a cross section of the tread section 20 in this embodiment in the width direction.

As depicted in FIG. 3 and FIG. 4, each of the land sections projects to the outer side further than the tire reference contour line L in the tire radial direction. Here, a position of a portion of each of the land sections, which projects the most from the tire reference contour line L in the normal direction thereof, on the ground-contact surface is set as a maximum projecting position. In addition, height from the tire reference contour line L to the maximum projecting position in the normal direction of the tire reference contour line L is set as a projection amount. In such a case, a projection amount h of the center land section 30 and a projection amount i of the mediate land section 50 are desirably equal to or more than 0.1 mm and equal to or less than 0.5 mm. Meanwhile, a projection amount j of the shoulder land section 40 is desirably equal to or more than 0.1 mm and is desirably equal to or less than a difference in the reference cap thickness between the center land section 30 and the shoulder land section 40.

Then, a thickness of the cap layer 22 at the maximum projecting position in such a projecting state (that is, a thickness from the boundary B between the base layer 21 and the cap layer 22 to the maximum projecting position in the normal direction of the tire reference contour line L) is also thick in the order of the center land section 30, the mediate land section 50, and the shoulder land section 40.

The maximum projecting position of the shoulder land section 40 is located in a region A (see FIG. 4) between a central position of the shoulder land section 40 in the tire width direction and a position on the main groove 23 side therefrom by ¼ of a length of the shoulder land section 40 in the tire width direction. That is, the maximum projecting position of the shoulder land section 40 is located on the ground-contact end g side from an end (a portion corresponding to f in FIG. 3) of the shoulder land section 40 on the main groove 23 side by a certain length, and the certain length is a length that is equal to or more than 25% and equal to or less than 50% of the total length of the shoulder land section 40 in the tire width direction. The certain length is further desirably equal to or more than 30% and equal to or less than 45% of the total length of the shoulder land section 40 in the tire width direction.

Meanwhile, in each of the center land section 30 and the mediate land section 50, the maximum projecting position exists at the center or near the center of the land section in the width direction.

In this embodiment, when compared to the one shoulder land section 40 and the one center land section 30, the one shoulder land section 40 has the larger ground-contact area than the other. Noted that the ground-contact area is an area of a portion in which the rubber of the tread section 20 actually comes in contact with a road surface and does not include an area of the opening end of the groove, such as a slit, to the ground-contact surface.

Here, a ratio of the ground-contact area of each of the land sections to a total ground-contact area of all of the land sections is set as area distribution. In such a case, in the case where the four main grooves 23 are provided as in this embodiment, the area distribution of one of the shoulder land sections 40 is desirably higher than the area distribution of the center land section 30 by 3% or more. For example, in the embodiment in FIG. 2, the area distribution of the center land section 30 is 15.5%, the area distribution of one of the shoulder land section 40 is 21.5% to 26.5%, and thus this condition is satisfied. Noted that a total of the area distribution of all of the land sections is 100%.

In this embodiment, the shoulder land section 40 has a slit 42 that extends in the tire width direction. As depicted in FIG. 3, in the most projecting position of the shoulder land section 40, a depth D of a slit 42 from the ground-contact surface in the normal direction of the tire reference contour line L is shallower in the shoulder land section 40 on a vehicle outer side (a right side in FIG. 2 and FIG. 3) than in that on a vehicle inner side (a left side in FIG. 2 and FIG. 3). Accordingly, the shoulder land section 40 on the vehicle outer side has higher rigidity than the shoulder land section 40 on the vehicle inner side. In particular, the rigidity of the shoulder land section 40 on the vehicle outer side is high at the maximum projecting position.

Noted that, in the case where two or more types of the slits 42 in different modes are provided in the one shoulder land section 40, the thickest slit 42 in the shoulder land section 40 on the vehicle outer side only needs to be shallower at the maximum projecting position than the thickest slit 42 in the shoulder land section 40 on the vehicle inner side. For example, as in FIG. 2, in the case where two types of slits 42a, 42b in different modes are provided in the shoulder land section 40 on the vehicle outer side, the thicker slit 42a only needs to be shallower at the maximum projecting position than the slit 42 in the shoulder land section 40 on the vehicle inner side. In addition, in the case where two or more types of the slits 42 that have the same thickness but differ in modes are provided in the one shoulder land section 40, an average value of the depth of those slits 42 at the maximum projecting position is set as the depth of the thickest slit 42 at the maximum projecting position in the shoulder land section 40. For example, as in FIG. 2, in the case where two types of slits 42c, 42d that have the same thickness but differ in modes are provided in the one shoulder land section 40, an average value of a depth of the slits 42c, 42d at the maximum projecting position is set as the depth of the thickest slit 42 at the maximum projecting position in this shoulder land section 40.

In the pneumatic tire 10 of this embodiment, the thickness from the boundary B between the cap layer 22 and the base layer 21 to the tire reference contour line L in the normal direction of the tire reference contour line L is thick in the order of the center land section 30, the mediate land section 50, and the shoulder land section 40, and both of the center land section 30 and the mediate land section 50 project to the outer side further than the tire reference contour line L in the tire radial direction. Meanwhile, because the shoulder land section 40 also projects to the outer side further than the tire reference contour line L in the tire radial direction, the shoulder land section 40 has a favorable ground-contact property.

In addition, in the cases where the maximum projecting position of the shoulder land section 40 is located on the ground-contact end g side from the end of the shoulder land section 40 on the main groove 23 side by the certain length and where the certain length is equal to or more than 25% of the total length of the shoulder land section 40 in the tire width direction, the maximum projecting position is not deviated to the main groove 23 side of the shoulder land section 40, and thus a ground-contact length of the shoulder land section 40 in the tire circumferential direction is sufficiently secured. Furthermore, in the case where the certain length is equal to or less than 50% of the total length of the shoulder land section 40 in the tire width direction, ground-contact pressure on the ground-contact end g side in the shoulder land section 40 is prevented from being excessively high during braking. Thus, a braking property is secured. Moreover, in the case where the certain length falls within the above range, concentration of the ground-contact pressure at the end on the main groove 23 side or at the ground-contact end g of the shoulder land section 40 can be prevented, and the ground-contact pressure can be made uniform for the entire shoulder land section 40. As a result, the pneumatic tire 10 excels in the braking property and a handling property. In addition, in the case where the certain length is equal to or more than 30% and equal to or less than 45% of the total length of the shoulder land section 40 in the tire width direction, these effects become even more prominent.

Furthermore, in the case where the ground-contact area of the shoulder land section 40 is larger than the ground-contact area of the center land section 30, the ground-contact pressure of the shoulder land section 40 tends to be lowered. However, even in such a case, when the shoulder land section 40 projects to the outer side further than the tire reference contour line L in the tire radial direction as described above, the ground-contact pressure of the shoulder land section 40 is increased, and thus the pneumatic tire 10 excels in the braking property and the handling property.

Moreover, in the case where the hardness of the cap layer 22 is equal to or more than 62°, such an effect that the shoulder land section 40 projects to the outer side further than the tire reference contour line L in the tire radial direction is enhanced, and thus the pneumatic tire 10 excels in the braking property and the handling property.

Various types of modifications, replacement, omission can be made to this embodiment within a scope that does not depart from the gist of the invention.

For example, the number of the main grooves may be three. In such a case, the four land sections align in the tire width direction. The two central land sections that are closest to the tire equator are the center land sections, and the two land sections that are located on both sides thereof and each have the ground-contact end are the shoulder land sections. In addition, the center land section and the shoulder land section respectively have the same characteristics as the land sections in the above embodiment. That is, the thickness from the boundary between the cap layer and the base layer to the tire reference contour line is thicker in the center land section than in the shoulder land section. In addition, the center land section and the shoulder land section project to the outer side further than the tire reference contour line in the tire radial direction, and the thickness of the cap layer in the projecting state is thicker in the center land section than in the shoulder land section. Furthermore, the maximum projecting position exists in the region between the central position of the shoulder land section in the tire width direction and the position on the main groove side therefrom by ¼ of the length of the shoulder land section in the tire width direction.

The braking properties and the handling properties of pneumatic tires in comparative examples and examples depicted in Table 1 were examined. The pneumatic tire in Conventional Example 1 is a pneumatic tire in which none of the land sections projects from the tire reference contour line. The pneumatic tire in Example 1 is the pneumatic tire of the above embodiment. The pneumatic tire in Comparative Example 1 differs from the pneumatic tire in Example 1 in a point that the maximum projecting position of the shoulder land section is located on the ground-contact end side with respect to the central position in the tire width direction. The pneumatic tire in Comparative Example 2 differs from the pneumatic tire in Example 1 in a point that the thickness of the cap layer in the projecting state is thicker in the shoulder land section than in the center land section. In Table 1, a reference thickness is the thickness from the boundary between the base layer and the cap layer to the tire reference contour line in the normal direction of the tire reference contour line. In addition, a post-projection thickness is the thickness of the cap layer in the projecting state.

All of these tires are in size of 225/50R17. Each of these tires was assembled to the standard rim, was applied with the normal internal pressure, and was mounted to the vehicle. Then, the braking property and the handling property thereof were examined. The definitions of the standard rim and the normal internal pressure are as described above.

Both of the braking property and the handling property were examined by running the vehicle on a road surface with 1 mm of water coating. The braking property was evaluated by a travel distance from application of full braking at a vehicle speed of 100 km/h to the vehicle speed of 0 km/h (a stopped state). A driver functionally evaluated the handling property by driving straight and making slaloms at the vehicle speed of 60 to 140 km/h. Each of the braking property and the handling property is represented by an index with a result in Comparative Example 1 being 100. As the index is increased, excellence of each of these properties is enhanced.

The result was as depicted in Table 1. The braking properties and the handling properties of the tires in the examples were superior to those of the tires in the conventional example and the comparative examples. From this fact, the effect of this embodiment could be confirmed.

TABLE 1

|  |  | Conventional Example 1 | Example 1 | Comparative Example 1 | Comparative Example 2 |
| --- | --- | --- | --- | --- | --- |
| Reference thickness (mm) | Center land section | 8.3 | 8.3 | 8.3 | 8.3 |
|  | Mediate land section | 8.0 | 8.0 | 8.0 | 8.0 |
|  | Shoulder land section | 7.6 | 7.6 | 7.6 | 7.6 |
| Post-projection thickness (mm) | Center land section | 8.3 | 8.6 | 8.6 | 8.6 |
|  | Mediate land section | 8.0 | 8.3 | 8.3 | 8.3 |
|  | Shoulder land section | 7.6 | 7.9 | 7.9 | 8.7 |
| Ratio of length that is from the end on the main groove side to the maximum projecting position of the shoulder land section to the total length of the shoulder land section in the width direction (%) |  | — | 40% | 80% | 40% |
| Area distribution (%) | Center land section | 16 | 16 | 16 | 16 |
|  | Shoulder land section | 25 | 25 | 25 | 25 |
| Hardness of cap layer (°) |  | 70 | 70 | 70 | 70 |
| Braking property (index) |  | 100 | 108 | 102 | 95 |
| Handling property (index) |  | 100 | 110 | 102 | 95 |

The invention claimed is:

1. A pneumatic tire in which a tread section includes: a base layer on an inner side in a tire radial direction; and a cap layer including a ground-contact surface on an outer side thereof in the tire radial direction, in which the tread section is partitioned by a main groove to at least include a center land section and a shoulder land section, and in which a thickness from a boundary between the cap layer and the base layer to a tire reference contour line is thicker in the center land section than in the shoulder land section, the base layer is depressed and thinner in regions below the main grooves, and the cap layer is also depressed and thinner below the main grooves, wherein
the center land section and the shoulder land section project to an outer side further than the tire reference contour line, a thickness of the cap layer in a projecting state is thicker in the center land section than in the shoulder land section, and a position where the shoulder land section projects the most exists in a region between a central position of the shoulder land section in a tire width direction and a position on the main groove side therefrom by ¼ of a length of the shoulder land section in the tire width direction.

2. The pneumatic tire according to claim 1, wherein the shoulder land section has a larger ground-contact area than the center land section.

3. The pneumatic tire according to claim 1, wherein a hardness of the cap layer is equal to or larger than 62°.

4. The pneumatic tire according to claim 1, wherein
the shoulder land section includes a slit that extends in the tire width direction, and a depth of the slit at the position where the shoulder section projects the most is shallower in the shoulder land section on a vehicle outer side than in that on a vehicle inner side.

5. The pneumatic tire according to claim 1, further comprising
a mediate land section between the center land section and the shoulder land section.

* * * * *